United States Patent [19]
Nielsen et al.

[11] Patent Number: 5,837,217
[45] Date of Patent: Nov. 17, 1998

[54] PROCESS FOR THE PREPARATION OF HYDROGEN RICH GAS

[75] Inventors: Poul Erik Højlund Nielsen, Fredensborg; Peter Lehrmann, Birkerød; Nials Jørgen Blom, Hillerød, all of Denmark

[73] Assignee: Haldor Topsoe A/S, Lyngby, Denmark

[21] Appl. No.: 678,093

[22] Filed: Jul. 11, 1996

[30] Foreign Application Priority Data

Jul. 21, 1995 [DK] Denmark ................................. 0852/95

[51] Int. Cl.$^6$ ....................................................... C01B 3/02
[52] U.S. Cl. ..................................... 423/648.1; 423/437.1
[58] Field of Search ............................... 423/648.1, 437.1

[56] References Cited

U.S. PATENT DOCUMENTS 4,631,266  12/1986  Wold et al. .......................... 423/648.1
5,626,794   5/1997  Bhattacharyya et al. ............... 252/373

*Primary Examiner*—Wayne Langel
*Attorney, Agent, or Firm*—Ostrolenk, Faber, Gerb & Soffen, LLP

[57] ABSTRACT

Process for the preparation of hydrogen rich gas from a feed stock consisting of the dimethyl ether and steam, wherein the dimethyl ether is reacted with steam in presence of an ether hydration catalyst selected from the group of solid acids and a methanol decomposition catalyst being arranged in physical admixture in a fixed bed reactor.

4 Claims, No Drawings

PROCESS FOR THE PREPARATION OF HYDROGEN RICH GAS

The present invention is related to the manufacture of a gas being rich in hydrogen. More particular, the invention is a process for the preparation of such gas from a feed stock consisting of dimethyl ether (DME).

Decomposition of DME to hydrogen proceeds by a two step reaction. In a first reaction the ether is hydrated to methanol by the reaction:

$$CH_3OCH_3 + H_2O \rightleftharpoons 2CH_3OH \quad (1)$$

$$\Delta H_{298.1} = 5.28 \text{ kcal/mole}$$

and methanol produced during hydration of DME is in a second step decomposed to carbon oxides and hydrogen:

$$CH_3OH + H_2O \rightleftharpoons CO_2 + 3H_2 \quad (2)$$

$$CO_2 + H_2 \rightleftharpoons CO + H_2O \quad (3)$$

Both reactions may take place in gas and liquid phase.

Reaction (1) proceeds in the presence of weak acids at a very low reaction rate and the reaction is thermodynamically unfavourable to methanol. Methanol decomposition by the above reactions (2) and (3) is known to be catalyzed by a solid catalyst, usually based on copper, zinc and aluminum oxides. Thermodynamically it is favoured by high temperature, low pressure and high steam concentration.

It has now been found that the reaction rate during hydration of DME to methanol by reaction (1) is much improved when carrying out the reaction in presence of a solid acid.

It has furthermore been observed that the overall reaction of DME to hydrogen rich gas by the following reaction:

$$CH_3OCH_3 + 3H_2O \rightleftharpoons 2CO_2 + 6H_2$$

$$\Delta H_{298.1} = 29.28 \text{ kcal/mole DME} \quad (4)$$

proceeds at reasonable reaction rates and at high product yield and selectivity for the formation of hydrogen and carbon oxides, when overcoming the equilibrium limitations of DME hydration reaction (1) by removing produced methanol as it forms through the reaction of methanol to hydrogen and carbon oxides according to the above reactions (2) and (3).

Pursuant to the above findings and observations, this invention is a process for the preparation of hydrogen rich gas from a feed stock consisting of the dimethyl ether and steam, wherein the dimethyl ether is reacted with steam in presence of an ether hydration catalyst selected from the group of solid acids and a methanol decomposition catalyst being arranged in physical admixture in a fixed bed reactor.

A suitable catalyst for the hydration of dimethyl ether is any of the solid acids. Preferably, the hydration catalyst comprises acidic zeolites, most preferably ZSM-5 in its H-form.

The DME hydration catalyst is physically admixed with the methanol decomposition catalyst of, preferably, Cu-Zn-alumina in a weight ratio of between 1:5 and 5:1 as supplied from Haldor Topsøe A/S.

Prior to contact with the feed gas, the catalysts are brought in their active form, which for the hydration catalyst is the hydrogen form obtained by ion exchange of the catalyst with a proton donating solution. The methanol decomposition catalyst is conventionally activated through contacting the catalyst with a reducing gas.

Useful forms of the catalyst are extrudates, pellets, granulates and the like being conventional employed in a fixed bed of solid catalyst particles.

When operating the above process, DME feedstock is introduced together with steam in a mole ratio of 1:1–1:10, preferably 1:2–1:5. The mixed DME/steam process gas is then passed at a pressure of between 1–100 bar and a space velocity of 1000–5000 h$^{-1}$ through the catalyst bed.

At a reaction temperature above 200° C., preferably 250° C., conversion of DME to hydrogen and carbon oxides is substantially complete at the above reaction conditions.

The above aspects and features of the invention are further described in the following Examples illustrating specific embodiments of the invention.

EXAMPLE 1

In a tubular reactor 3.00 g of a catalyst mixture consisting of a conventional methanol decomposition Cu-Zn-Al catalyst (available from Haldor Topsøe A/S, Denmark under the tradename MDK-20) and silica-alumina from Condea (SIRAL 5) in a weight ratio of 1:1 were arranged in fixed bed manner.

The properties of SIRAL 5 are as follows:

Product: SIRAL 5
Chemical Name: Aluminosilicate
Crystal Structure: Boehmite (alpha Alumina Monohydrate)
Physical Form: white, odorless powder

|  | Specification: |  |
|---|---|---|
| Chemical Data: | | |
| Al2O3:sio2% | 96–94:4–0 | |
| C% | 0.5. max. | |
| Fe2O3% | 0.02 max. | |
| Na2O% | 0.01 max. | |
| L.O.I.% | 25.0 max. | |
| Physical Properties: | | |
| Ultimate Crystallite Size (120 reflex) | Angstroem | 45–55 |
| Surface Area* (BET) | m2/g | 300–400 |
| Pore Volume* (1.75–100 nm) | ml/g | 0.6–0.8 |
| Loose Bulk Density | g/l | 450–650 |
| Spec. Acidity (typical) | 10E-04 mmol n-Butylamine/m2 | 14 |
| Particle Size Distribution: | | |
| <25 microns% | 40.0 max. | |
| <45 microns% | 70.0 max. | |
| <90 microns% | 75.0 min. | |

*after activation 3h/555° C.

The catalyst mixture was in form of 0.5–1.0 mm granulates.

A process gas of DME and H$_2$O(¼ mole/mole) was introduced into the reactor at a flow of 1.6 g DME/h and a pressure of 1.2 bar.

The process was performed isothermically at different temperatures as specified below in Table 1.

The results obtained are summarized in Table 1.

TABLE 1

| T° C. | H$_2$ | CO | mole %<br>CO$_2$ | CH$_4$ | CH$_3$OH | H$_2$O | DME |
|---|---|---|---|---|---|---|---|
| 250 | 2.5 | 0.0 | 0.8 | 0.00 | 2.3 | 77.1 | 17.3 |
| 300 | 44.0 | 0.4 | 14.5 | 0.03 | 0.2 | 34.5 | 6.4 |
| 325 | 65.2 | 3.2 | 19.5 | 0.03 | 0.0 | 12.1 | 0.1 |
| 350 | 64.0 | 4.3 | 18.9 | 0.03 | 0.0 | 12.8 | 0.0 |
| 375 | 63.3 | 5.2 | 18.0 | 0.03 | 0.0 | 13.6 | 0.0 |
| 400 | 62.8 | 6.1 | 16.7 | 0.03 | 0.0 | 14.6 | 0.0 |

EXAMPLE 2

In a process similar to the process described in Example 1, DME was converted to hydrogen rich gas at temperatures as specified in Table 2 below. In this Example, the reactor was loaded with an activated catalyst mixture consisting of 3.0 g of the MDK-20 methanol decomposition catalyst and ZSM-5 a crystalline aluminosilicate zeolite described more fully in U.S. Pat. No. 3,702,886 (mixed in a ratio of 1:1 by weight; particle size 0.5–1.0 mm granulates).

The results obtained by the process of this Example are specified in Table 2.

TABLE 2

| T° C. | H$_2$ | CO | mole %<br>CO$_2$ | CH$_4$ | CH$_3$OH | H$_2$O | DME |
|---|---|---|---|---|---|---|---|
| 225 | 57.1 | 0.3 | 18.8 | 0.00 | 1.2 | 19.7 | 2.9 |
| 250 | 67.0 | 1.0 | 21.3 | 0.00 | 0.1 | 10.5 | 0.1 |
| 300 | 65.3 | 2.4 | 20.8 | 0.00 | 0.0 | 10.4 | 0.0 |

We claim:

1. Process for the preparation of hydrogen rich gas from a feed stock consisting of dimethyl ether and steam, wherein the dimethyl either is reacted with steam in the presence of (1) an ether hydration catalyst consisting essentially of a member of the group consisting of ZSM in its hydrogen form and SIRAL 5; and (2) a methanol decomposition catalyst, said catalysts being arranged in physical admixture in a fixed bed reactor.

2. Process of claim 1, wherein the weight ratio of the methanol decomposition catalyst and the ether hydration catalyst is between 1:5 and 5:1.

3. Process of claim 1, wherein the reaction is carried out at a temperature between 150°–450° C. and a pressure from 1–100 bar.

4. Process of claim 3, wherein the reaction is carried out at a temperature between 200°–400° C. and a pressure from 2–50 bar.

* * * * *